Patented July 1, 1924.

1,499,749

UNITED STATES PATENT OFFICE.

PAUL REHLÄNDER, OF BERLIN-CHARLOTTENBURG, GERMANY.

COMPOSITION FOR TONING PHOTOGRAPHIC SILVER IMAGES.

No Drawing. Application filed May 22, 1922. Serial No. 562,811.

*To all whom it may concern:*

Be it known that I, PAUL REHLÄNDER, chemist, a citizen of the German Empire, residing at Konigin Luisestreet 9, Berlin-Charlottenburg, Germany, have invented certain new and useful Improvement in Composition for Toning Photographic Silver Images, of which the following is a specification.

The present invention refers to toning agents for photographic silver images.

The toning agent according to the present invention consists of solid selenosulphates of the alkali metals or solid mixtures containing selenosulphates, mixed or compounded with sulphites of the alkali metals. Such solid sulphates are those of potassium, rubidium, cæsium. A suitable solid mixture is sodiumthiosulphate and sodiumselenosulphate for instance in the proportion of 90% sodiumthiosulphate and 10% sodiumselenosulphate.

B. Rathke has indicated the preparation of solid potassium selenosulphate, perhaps in impure state and the preparation of the mixed salt of sodium selenosulphate with sodium thiosulphate, the preparation of sodium selenosulphate alone in solid state being impossible, see Journal für praktische Chemie, 1865 volume 5, page 7.

The said solid mixtures, unknown hitherto, have when compared with the selenosulphates hitherto known only in solution the advantage that they may be easily stored and may be easily dissolved in water or diluted alcohol without the danger of a decomposition under deposition of free selenium, which occurs in treating the solid salts in pure water.

Examples of suitable mixtures according to the invention are 1. 100 parts by weight potassium selenosulphate and 50 parts by weight potassium sulphite, 2. 90 parts by weight sodiumthiosulphate, 10 parts by weight sodium selenosulphate, 15 or 20 parts by weight of sodiumsulphite.

From these solid mixtures one may prepare solutions suitable for toning photographic silver images by digesting the mixtures with water or diluted alcohol, so that for instance solutions containing 2–5% sodium sulphite are obtained.

Solutions of the toning agents in water or dilute alcohol may be obtained in treating the solid selenosulphates or their solid mixtures with water in the presence of sulphites of the alkali metals, either in the solid state or in aqueous or in aqueous alcoholic solution.

Example 3. 1 gram solid potassium selenosulphate is dissolved in 25 cubic centimeters aqueous (or aqueous alcoholic) solution of potassium sulphite of 20% and the obtained solution is added to 500 cubic centimeters water containing 100 grams sodium thiosulphate. Silver images on paper are toned with the said solution in brown black and violet brown shades.

4. 10 grams of so called sodiumselenosulphate mixture crystals composed of 90% sodiumthiosulphate and 10% sodiumselenosulphate are dissolved in 25 cubic centimeters aqueous solution of sodiumsulphite of 5%. The obtained solution is added to 500 cubic centimeters of aqueous sodiumthiosulphate solution of 20%. The toning effect of the solution is as in example 3.

5. 10 grams of so called sodiumselenosulphate mixture crystals composed of 90% sodiumthiosulphate and 10% sodiumselenosulphate are intimately triturated with 5 grams solid sodium sulphite and dissolved in 500 cubic centimeters aqueous sodiumthiosulphate solution of 20%. The toning effect of the solution is as in example 3.

6. 1 gram rubidiumselenosulphate is dissolved in 25 cubic centimeters aqueous or aqueous alcoholic sodiumsulphite solution of 20% and added to 500 cubic centimeters water containing 100 grams sodiumthiosulphate. The toning effect of the solution is as in example 3.

7. 0.2 gram cæsiumselenosulphate are dissolved in 5 cubic centimeters of an aqueous solution of potassiumsulphite of 20% and added to a solution of 20 grams potassiumthiosulphate in 100 cubic centimeters water. The toning effect of the solution is as in example 3.

The solutions according to the invention contain more toning selenium in 100 parts by weight of the solution than the solutions of sodiumselenosulphate of 8–9% the highest which may be obtained, containing only about 3% active toning selenium. With potassium selenosulphate according to the invention one may prepare solutions of 30%, containing about 10% active toning selenium. One may prepare such solutions of high percentage by dissolving 40 grams potassium sulphite in 68 cubic centimeters water, boiling for one day with 30 grams selenium under reflux and allowing to cool. A certain amount of selenium is deposited and one obtains after filtration a solution of potassium selenosulphate and potassium sulphite containing 30% potassiumselenosulphate with 10% active toning selenium.

One prepares concentrated solution of rubidiumselenosulphate or cæsiumselenosulphate by boiling aqueous solutions of rubidium sulphite or cæsium sulphite with selenium or mixtures of the said sulphites of rubidium or cæsium and potassium or sodiumsulphite.

8. 2 cubic centimeters of the potassium-selenosulphate solution of 30% is added to 10 cubic centimeters of aqueous solution of potassium sulphite of 20% and added to 500 cubic centimeters of aqueous potassiumthiosulphate solution of 20%. The toning effect of the solution is as in example 3.

The process for toning consists in that the sensitized image after washing is immersed into the solution of the toning baths according to the present invention, whereupon a washing and fixing may be carried out.

I claim:—

1. Toning agents for photographic silver images consisting of solid selenosulphates of alkali metals and sulphites of alkali metals.

2. Toning agents for photographic silver images consisting of the solid mixtures of selenosulphates with thiosulphates of alkali metals and sulphites of alkali metals.

In testimony whereof I hereunto affix my signature.

Dr. PAUL REHLÄNDER.